(12) United States Patent
Haase et al.

(10) Patent No.: US 11,502,591 B2
(45) Date of Patent: Nov. 15, 2022

(54) ELECTRIC MOTOR HAVING A MAGNETIC TRACK WITH A PLURALITY OF A MAGNET ELEMENTS

(71) Applicant: PHYSIK INSTRUMENTE (PI) GMBH & CO. KG, Karlsruhe (DE)

(72) Inventors: Thomas Haase, Steinweiler (DE); Tobias Serrer, Karlsruhe (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 205 days.

(21) Appl. No.: 16/954,727

(22) PCT Filed: Dec. 6, 2018

(86) PCT No.: PCT/EP2018/083793
§ 371 (c)(1),
(2) Date: Jun. 17, 2020

(87) PCT Pub. No.: WO2019/121037
PCT Pub. Date: Jun. 27, 2019

(65) Prior Publication Data
US 2020/0389080 A1      Dec. 10, 2020

(30) Foreign Application Priority Data
Dec. 20, 2017 (DE) .......................... 102017130724.9

(51) Int. Cl.
*H02K 41/03* (2006.01)
*H02K 3/26* (2006.01)
*H02K 3/28* (2006.01)

(52) U.S. Cl.
CPC ............. *H02K 41/031* (2013.01); *H02K 3/26* (2013.01); *H02K 3/28* (2013.01); *H02K 2203/03* (2013.01)

(58) Field of Classification Search
CPC .. H02K 3/24; H02K 3/26; H02K 3/28; H02K 2203/03; H02K 41/02; H02K 41/03; H02K 41/031
(Continued)

(56) References Cited

U.S. PATENT DOCUMENTS 4,536,672 A    8/1985  Kanayama et al. .......... 310/268
5,359,245 A *  10/1994 Takei .................... H02K 41/031
                                                    310/68 B
(Continued)

FOREIGN PATENT DOCUMENTS

CN    202872492 U    4/2013    ............... H02K 3/26
CN    103891114 A    6/2014    ............. H01L 21/67
(Continued)

OTHER PUBLICATIONS

The Notification Concerning Transmittal of International Preliminary Report on Patentability (Chapter I of the Patent Cooperation Treaty), in English, dated Jul. 2, 2020, which was issued by the International Bureau of WIPO in Applicant's corresponding international PCT application having Serial No. PCT/EP2018/083793, filed on Dec. 6, 2018.
(Continued)

*Primary Examiner* — Rashad H Johnson
(74) *Attorney, Agent, or Firm* — Bodner & O'Rourke, LLP; Gerald T. Bodner; Christian P. Bodner (57) ABSTRACT

The invention relates to an electric motor having at least one magnetic track, which has a plurality of magnet elements connected in a line in a longitudinal direction or in the shape of a ring, in particular in a Halbach array configuration, and having at least one coil assembly, which includes a support that is substantially electrically and magnetically non-conductive with respect to the magnetic track, which is configured such that the coil assembly and the magnetic track are
(Continued)

capable of carrying out a guided movement relative to each other, and which includes at least one group of three conductive flat coils. Each of the three flat coils is connected to one phase of a three-phase power supply, and the conductor tracks of the three flat coils of the group or of each group are arranged so as to be nested in each other or overlap with each other on a first and second support conductor plane, which are electrically insulated from each other by an insulating intermediate layer, such that parts of the conductor pattern of each of the three flat coils are designed to be connected one over the other and together in parallel on the first and second conductor plane and two of the three overlapping flat coils in each case have crossover regions in which the conductor tracks of the first flat coil only run on the first support conductor plane and the conductor tracks of the second flat coil only run on the second support conductor plane.

16 Claims, 7 Drawing Sheets

(58) Field of Classification Search
USPC .............. 310/12.18, 12.24, 12.25, 12.26, 59
See application file for complete search history.

(56) References Cited

U.S. PATENT DOCUMENTS

| | | | | |
|---|---|---|---|---|
| 6,140,734 | A * | 10/2000 | Hazelton .............. | H02K 15/061 310/58 |
| 6,160,327 | A | 12/2000 | Wang ........................ | 310/12.02 |
| 6,265,793 | B1 * | 7/2001 | Korenaga .............. | H02K 41/03 310/12.22 |
| 6,664,664 | B2 | 12/2003 | Botos et al. ............... | 310/12.25 |
| 7,482,716 | B2 * | 1/2009 | Sugita .................... | H02K 41/03 310/12.25 |
| 7,989,993 | B1 * | 8/2011 | Li .......................... | H02K 41/03 310/12.24 |
| 8,067,863 | B2 * | 11/2011 | Giovanardi .......... | H02K 41/031 310/12.24 |
| 8,115,348 | B2 * | 2/2012 | Hsu ....................... | H02K 41/03 310/12.22 |
| 8,624,446 | B2 * | 1/2014 | Chung .................. | H02K 16/04 310/12.24 |
| 9,148,047 | B2 * | 9/2015 | Hsu ....................... | H02K 9/223 |
| 9,685,849 | B2 | 6/2017 | Lu et al. | |
| 10,461,612 | B2 | 10/2019 | Gloss | |
| 11,196,330 | B2 * | 12/2021 | Jedinger ................ | H02K 3/28 |
| 2002/0047320 | A1 * | 4/2002 | Hwang ................. | H02K 41/03 310/12.26 |
| 2002/0185919 | A1 * | 12/2002 | Botos ..................... | H02K 3/26 310/12.25 |
| 2005/0151428 | A1 * | 7/2005 | Miyashita ............. | H02K 41/03 310/12.26 |
| 2006/0028070 | A1 * | 2/2006 | Sahin Nomaler .... | H02K 41/031 310/12.25 |
| 2008/0048505 | A1 * | 2/2008 | Moriyama ............ | H02K 41/03 310/12.25 |
| 2009/0127939 | A1 * | 5/2009 | Kaneshige ............ | H02K 41/03 310/12.24 |
| 2010/0117461 | A1 * | 5/2010 | Eastham ............... | H02K 41/025 310/210 |
| 2010/0117479 | A1 * | 5/2010 | Eastham ................ | H02K 41/02 310/198 |
| 2010/0225179 | A1 * | 9/2010 | Wang .................... | H02K 41/031 310/12.26 |
| 2011/0316357 | A1 * | 12/2011 | Braun ..................... | H02K 11/40 310/12.09 |
| 2012/0326534 | A1 * | 12/2012 | Stadnik .................. | H02K 21/24 310/216.002 |
| 2013/0015725 | A1 * | 1/2013 | Trammell ............ | H02K 41/031 310/12.26 |
| 2013/0015726 | A1 * | 1/2013 | Trammell ............ | H02K 41/031 310/12.26 |
| 2013/0093264 | A1 * | 4/2013 | Aoyama .............. | H02K 41/031 310/12.05 |
| 2015/0054372 | A1 * | 2/2015 | Chung ..................... | H02K 1/24 310/216.096 |
| 2020/0389080 | A1 * | 12/2020 | Haase ................... | H02K 41/031 |

FOREIGN PATENT DOCUMENTS

| | | | |
|---|---|---|---|
| DE | 102015222482 A1 | 5/2017 | ............. H02K 1/27 |
| EP | 0133571 A2 | 2/1985 | ............. H02K 21/24 |
| JP | S6039336 A | 3/1985 | ............. H02K 21/24 |
| JP | H11299214 A | 10/1999 | ............... H02K 3/26 |
| WO | WO2013059934 A1 | 5/2013 | ............. H01L 21/67 |
| WO | WO2014079520 A2 | 5/2014 | ............... H02K 3/26 |
| WO | WO2017080859 A1 | 5/2017 | ............... H02K 3/26 |

OTHER PUBLICATIONS

The English translation of the International Preliminary Report on Patentability (Chapter I of the Patent Cooperation Treaty), dated Jun. 23, 2020, which was issued by the International Bureau of WIPO in Applicant's corresponding international PCT application having Serial No. PCT/EP2018/083793, filed on Dec. 6, 2018.

The Written Opinion of the International Searching Authority, in English, dated Feb. 22, 2019, which was issued by the International Bureau of WIPO in Applicant's corresponding international PCT application having Serial No. PCT/EP2018/083793, filed on Dec. 6, 2018.

The International Search Report, in English, dated Feb. 22, 2019, which was issued by the International Bureau of WIPO in Applicant's corresponding international PCT application having Serial No. PCT/EP2018/083793, filed on Dec. 6, 2018.

An Office Action (in Japanese) and an English translation thereof, dated Jul. 27, 2021, issued by the Japanese Patent Office for Applicant's related Japanese Patent Application No. JP 2020-534178, filed Dec. 6, 2018.

An Office Action (in Chinese) and an English translation thereof, dated Jan. 10, 2022, issued by the China National Intellectual Property Administration for Applicant's related Chinese Patent Application No. CN201880087961.7, filed Dec. 6, 2018.

An Office Action (in German) and an English translation thereof, dated Mar. 24, 2022, issued by the European Patent Office for Applicant's related European Patent Application No. EP18815190.6, filed Dec. 6, 2018.

An Office Action (in Korean) and an English translation thereof, dated Mar. 8, 2022, issued by the Korean Intellectual Property Office for Applicant's related Korean Patent Application No. KR1020207020432, filed Dec. 6, 2018.

* cited by examiner

ELECTRIC MOTOR HAVING A MAGNETIC TRACK WITH A PLURALITY OF A MAGNET ELEMENTS

The invention relates to an electric motor having a magnetic track, which has a plurality of magnet elements connected in a line in a longitudinal direction, in particular in a Halbach array configuration, and having a coil assembly, which includes a support that is substantially electrically and magnetically non-conductive with respect to the magnetic track, which is configured such that the coil assembly is capable of carrying out a guided movement relative to the stator magnetic track, and which includes at least one group of three conductive flat coils.

In most variable industrial applications, linear drives have been gaining increasing importance for decades. They are therefore the object of extensive development work, a considerable part of which is focused on the most efficient and thus cost-effective fabrication while guaranteeing high performance.

Linear motors typically include a plurality of coils or coil sets, which are arranged adjacent to one another, and a plurality of magnets arranged along a magnetic track with their North and South poles being alternating. By successively exciting the coils using a flow of electrical current, a movement of the coil assembly relative to the magnet arrangement, that means in the magnetic track, can be caused.

While the mentioned coils normally are built up from wound wires, there have been efforts during some years for a simpler fabrication in the form of so-called flat coils. These developments are in particular against the background of the need of smaller through to miniaturized linear motors, in which the conventional way of producing the coils becomes increasingly uneconomic with decreasing dimensions and ultimately could represent a limiting factor for the use of linear drives.

A linear motor having this novel construction is described in U.S. Pat. No. 6,664,664 B2. Here, a plurality of side-by-side flat coils is arranged on an elongate, non-conductive support, which will be connected to various phases of a multi-phase power supply. The document also teaches the multi-layered implementation of each flat coil by superimposed, substantially identical conductor routes in several conductor layers of a multi-plane printed circuit board. The geometrical configuration of these flat coils is that of a rectangle, and terminal regions each are arranged outside of the rectangles, which comprise through-holes through the multi-plane printed circuit board.

A multi-layered flat coil assembly is also known from the Applicant's WO 2017/080859 A1, namely as an integral part of a planar positioning apparatus and positioning table, respectively. In this case as well, a multiple-plane printed circuit board is used for the technical implementation, wherein a plurality of flat coils which are associated with one another, over the majority of their extent are designed as conductor runs of a first plane of the multiple-plane printed circuit board, and crossover regions of the flat coils substantially run in a second conductor plane of the multiple-plane printed circuit board.

The invention is based on the task of proposing an improved electric motor which is distinguished inter alia by enhanced efficiency at compact dimensions and can be produced in an efficient and cost-effective manner.

This task is solved by an electric motor having the features of claim 1. Appropriate further developments of the inventive idea are the object of the dependent claims.

The invention includes the idea of nesting a plurality (in practice specifically three) flat coils, in each case one of them being connected to the individual phases of a multi-phase current supply (specifically three-phase supply), for optimally utilizing the available conductor surface of a first and a second conductor plane on a non-conducting support. This has necessarily the consequence that certain conductor portions of the plurality of flat coils superimpose or cross one another. The mentioned interleaving is geometrically determined with respect to the two available conductor planes such that at any point conductor tracks of at most two of the three flat coils lie on top of each other. In those regions designated hereinafter as crossover regions, the conductor tracks of the one of the two flat coils are only formed in one of the two conductor planes, while the (crossing or superimposing) conductor tracks of the other flat coil run in the other of the two conductor planes. In all of those portions of the interleaved flat coils, however, where conductor tracks of two coils do not cross, both conductor planes are utilized for superimposed conductor tracks of one of the three flat coils.

Both the concept of interleaving (instead of arranging side-by-side) the associated flat coils within the multi-phase feeding scheme and the utilization of large regions of both conductor planes above and below the isolating intermediate layer for designing the conductor tracks of one of the flat coils result in a considerably improved utilization of the available conductor surface, and the concept additionally offers the option of a much more compact design of the flat coil set as a whole and thus possibly also of the overall linear motor.

Moreover, the arrangement of interleaved coils entails a homogenization of the force constants in the longitudinal direction of the support and enables improved magnet arrangements to be used, which do without magnetic flux return and thus can be designed to be more light-weight and compact, especially of so-called Halbach arrangements.

In an implementation of the invention, the magnetic track including the arrayed magnet elements and the flat coils of the coil assembly are dimensioned in mutual coordination such that the crossover regions of the flat coils are at least mainly outside of the projection of the magnet elements onto the coil assembly. Inhomogeneities of the magnetic field induced by the coils in the crossover regions thus remain mostly outside of the area of interaction with the magnets, whereby disturbances of the force constants are mostly avoided.

In a practically important implementation, the magnetic track is assigned to a stator, and the coil assembly is assigned to a rotor of the linear motor, and by way of example, the stator substantially has the shape of an elongate U profile, and in adaptation to the shape of the U profile, the rotor is realized to be plate-shaped or band-shaped such as to be able to move longitudinally inside the U profile. This is the predominant implementation of a linear motor; but it should be pointed out that the assignment of magnets and coil assembly to the stator and rotor may also be reversed. Neither is it imperative for the stator to have a U profile and for the rotor to have a plate shape or band shape. Rather, other geometrical configurations such as with T profiles or double T profiles are also possible. The required precise spacing between two magnet assemblies, which together form a magnetic track and between which a coil assembly is received as a rotor, may also be ensured by end-side spacers. In a longitudinal cut, such a stator would have the form of an elongate rectangle, at the long sides of which the two magnet arrangements are present.

In further implementations of the invention, the coil assembly comprises two or more groups of three flat coils each connected to one phase of the three-phase power supply, and the dimensioning of the coil assembly (in particular as rotor) and the magnetic track (in particular as stator) is performed in adaptation to the specific purpose of application and its marginal conditions and parameters, in particular the necessary path length, the force to be applied by the motor, the available installation space, etc.

In a technological and thus particularly advantageous implementation as far as costs are concerned, the support is designed as a multi-plane printed circuit board. In each case, exactly two adjacent conductor planes ("first" and "second" conductor planes) of the multi-plane printed circuit board are structured to form the three overlapping flat coils belonging together. The technology of structuring multi-plane printed circuit boards just as the technique of generating connections between the different conductor planes by vias with a selective connection of the vias to the respective conductor tracks in the single conductor planes, are established, reliable and cost-efficient technologies which can easily be utilized for manufacturing the coil assembly according to the invention. The associated design methods are also available.

As substantial benefits, the following should be mentioned:

Minimization of the development time of new motor sizes by means of appropriate software interfaces and due to multiple use of design elements and high reproducibility of assemblies, simple fabrication, short delivery times, low fabrication effort and important cost reductions, in particular in the case of high quantities.

The use of special magnet arrangements (especially in an elongate stator) that is possible in the context of the invention, inter alia yields the following further benefits:

The implementation of a unilateral magnet arrangement relative to the coil assembly is enabled, which in turn enables a particularly flat design.

Due to the possible waiving of magnetic flux return, the fabrication of the magnetic support from a light-weight, magnetically non-conductive material is enabled.

A reduction of the stray magnetic fields is possible.

As compared to conventional magnet arrangements with alternating N/S orientation, higher magnetic field strengths can be realized.

In a realization of the last-mentioned implementation, the support is designed as a multi-plane printed circuit board with 2m conductor planes (m≥2), in which each of the three overlapping flat coils belonging together of one group comprises 2 to m series-connected, substantially identical conductor tracks, wherein the electrical connections between the series-connected conductor tracks are realized by means of vertical vias through the multi-plane printed circuit board.

In a further implementation of the invention, each of the flat coils has a small connection and via region arranged directly on an outside of the respective flat coil. In this connection and via region, not only the external terminals but also the vias for connecting the superimposed, series-connected conductor tracks and for the external connection of the flat coil are placed. Note that the mentioned connection and via area at a flat coil outer edge typically dose not comprise all but only a part of all vias of the coil assembly. According to the features of the invention explained above, further vias are required in the crossover regions. In one implementation, the small connection region is respectively positioned close to a corner of a substantially rectangular flat coil configuration and comprises a hook-shaped conductor portion.

In a further implementation of the invention, the three flat coils belonging together formed by structuring in each case two conductor planes of the multi-plane printed circuit board, are configured to be substantially rectangular and arranged to be nested or overlapping such that the long sides of the rectangular conductor configurations in the first and second conductor plane each run in parallel to one another, and within the rectangle of one of the three flat coils, in each case the major part of the conductor run each of one long side of the two other flat coils is arranged.

The aspect is associated therewith that all conductors of the three flat coils each have the same distance from one another at the long sides of the rectangular conductor configurations, and within the three flat coils belonging together, a larger distance range is not present. In a further implementation, the distance between the adjacent conductor tracks is smaller than their width, in particular smaller than half of their width.

In particular by means of the last-mentioned aspects, the above-mentioned efficient utilization of the conductor surfaces on or in the support of the coil assembly enabled by the nested or overlapping arrangement of the flat coils assigned to the individual fibers is realized. Unlike the initially mentioned state of the art, virtually no conductor surface remains within the coil group belonging together which is not used in a physically effective way for conductor tracks of a flat coil.

A geometrically reasonable configuration for realizing the nesting or overlapping according to the invention provides that in the substantially rectangular conductor run of the flat coils, in each case a (virtual) corner of the rectangle is replaced by conductor portions running obliquely to the short and long sides. In the design, this is especially realized such that the obliquely running conductor portions of the three overlapping flat coils belonging together run adjacent to one another and nested in each other in the first and second conductor plane and become increasingly shorter toward the center of the respective rectangle.

In a further implementation of the invention, at least a part of the conductor runs is widened at least in a part of the crossover regions. Due to the current load being reduced by the widening, the widened portions of the conductor runs act as heat sinks of the respective flat coil. As a result, temperature increases are compensated in other portions of the conductor runs which cannot be realized to be widened for reasons of design and therefor experience more important heating due to the increased current load.

Further advantages and expediencies of the invention will result from the following description of exemplary embodiments and aspects based on the Figures. In these, shown are in.

Figure 1:
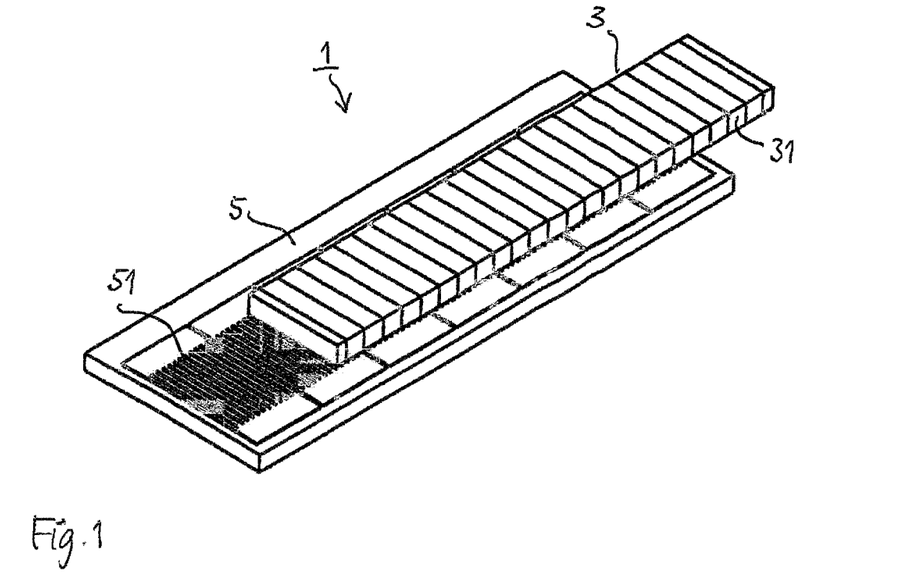
FIG. 1 a schematic perspective representation of a linear motor of the type according to the invention, FIGS. 2A to 2C schematic perspective representations of a further linear motor of the type according to the invention, FIG. 3 a schematic representation of the magnetic pole orientation in the magnetic track of a linear motor of the type shown in FIG. 1 or 2, FIG. 4 a representation of the conductor runs of a flat coil group of three flat coils belonging together, which according to the invention are arranged so as to be nested in each other or overlapped in or on a support, FIG. 5 a representation of the associated conductor tracks in a first and a second conductor plane of the support, FIG. 6 a representation of the coil group with the three flat coils nested in each other or overlapping one another, FIG. 7 a schematic representation of a plurality of flat coils of the structure shown in FIG. 6 and arrayed on a support and realized above one another in a plurality of support layers, FIG. 8 a schematic representation of a multi-plane printed circuit board in which the coil assembly according to FIG. 7 is realized, FIG. 9 a schematic representation of the coil assembly of FIG. 7 assigned to the magnetic track of a linear motor as illustrated in FIG. 1 or 2, and FIG. 10 a schematic perspective representation of a further electric motor of the type according to the invention.

FIG. 1 outlines the main component of an electric linear motor 1, namely an elongate band-shaped arrangement 3 of densely arrayed rod-shaped permanent magnets 31, and a plate-shaped coil assembly 5 which comprises an arrangement of flat coils 51 arrayed in the same direction as the permanent magnets. Normally, the magnet arrangement 3, together with an associated supporting structure, will form the stator of the linear motor, while the coil assembly 5 forms its rotor. As is already obvious from the schematic representation, the functions of stator/rotor may also be kinematically reversed, which is why hereinafter and in the claims the magnet arrangement will also be designated "magnetic track" and the arrayed arrangement of flat coils will be designated "coil assembly". By sequentially exciting in a known manner the flat coils (see further below) connected to various phases of a multi-phase power supply and due to the sequential structure of corresponding magnetic fields, a movement of the rotor along the stator is effectuated.

Figure 2A:
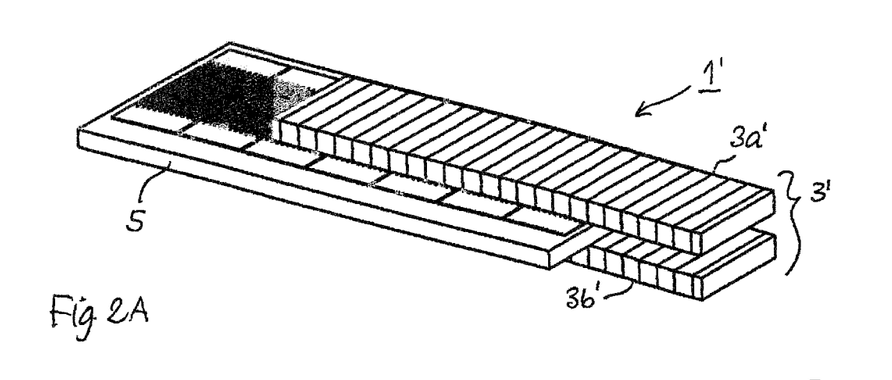
Figure 2B:
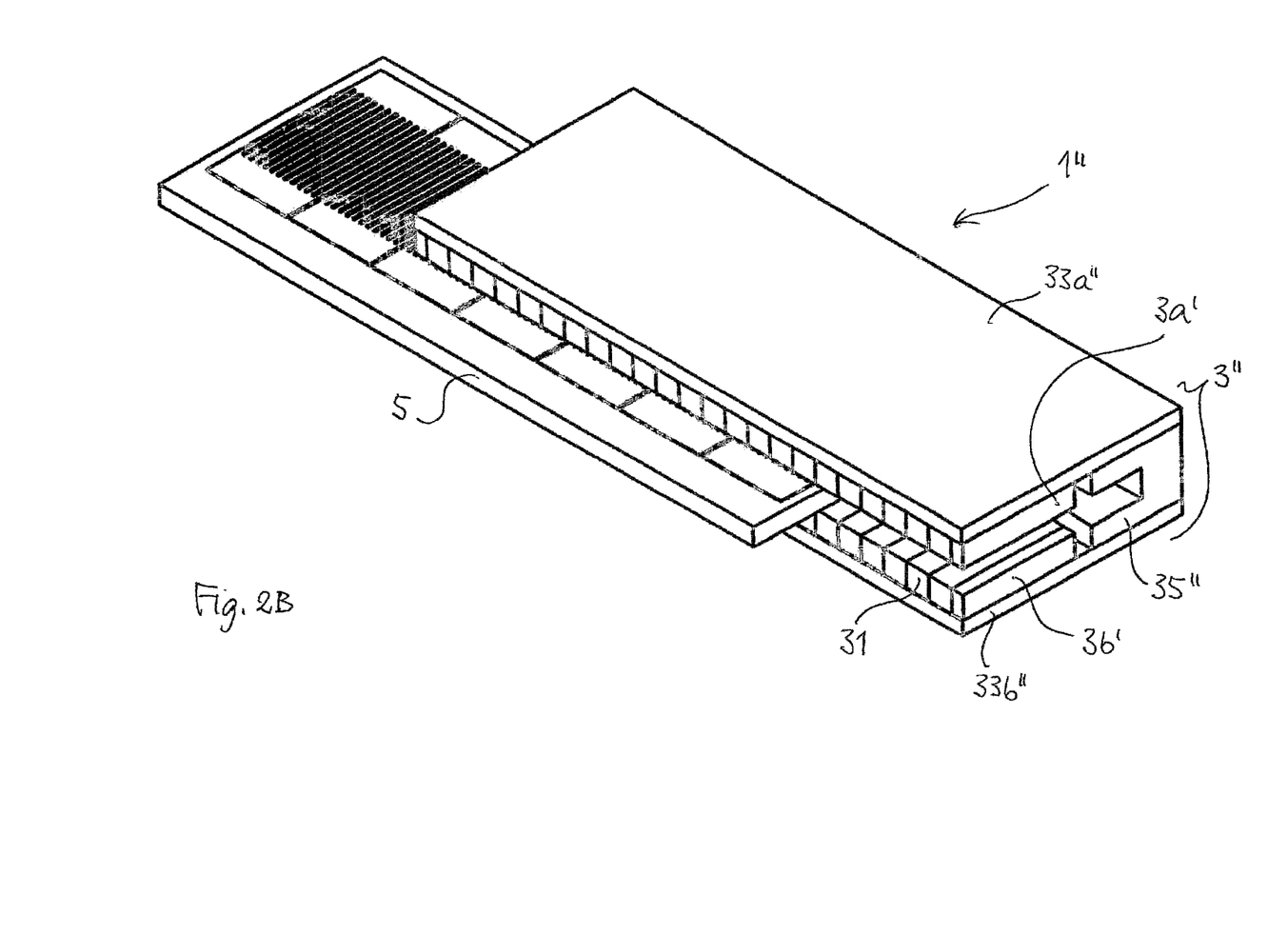
Figure 2C:
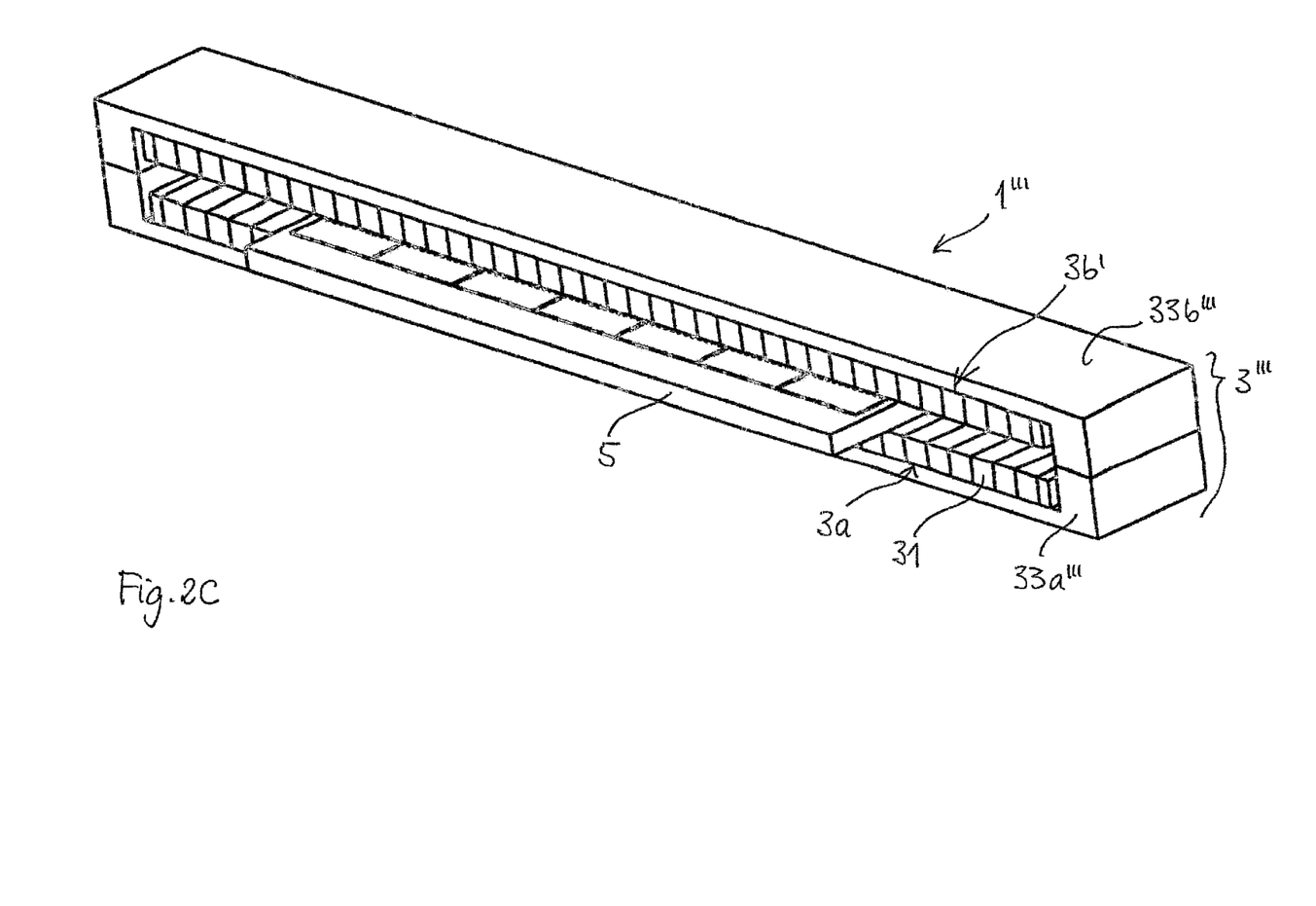

FIGS. 2A to 2C show modified implementations of the linear motor, which—with an otherwise identical structure—comprise a magnetic track 3' of two superimposed band-shaped magnet arrangements 3a' and 3b'. FIG. 2B shows a constructional implementation in which the magnet arrangements 3a' and 3b' are fixed on magnet supports 33a' and 33b", respectively, and the magnet supports are connected by an iron-free U profile member 35" to form a stator 3" of the linear motor 1". The U profile member 35" holds the magnet rows 3a' and 3b' at a constant distance and ensures a precise linear guidance for the relative movement of the coil assembly (the rotor) 5 in the longitudinal direction of the stator 3". FIG. 2C shows a further configuration of the linear motor, in which the last-mentioned function is realized in that two elongate magnet supports 33a" and 33b" that are U-shaped in the longitudinal section are used, which are placed on top of each other with their mutually facing open sides and thus form a rectangular stator 3''' of the linear motor 1''' which stator is rectangular in the longitudinal section.

Figure 3:
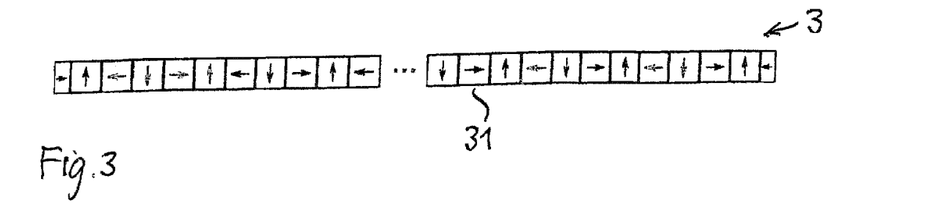

FIG. 3 schematically shows in a front view of the magnetic track 3 from FIG. 1 an exemplary sequence of the polarities of the individual permanent magnets 31. This is a so-called Halbach configuration in which the direction of magnetization of adjacent permanent magnets is in each case tilted against each other by 90 degrees in the direction of the longitudinal axis of the magnetic track, and in which, as a result, the magnetic flux is increased on the one side of the magnetic track (where the coil assembly is arranged in the linear motor), but on the other side, however, is reduced to almost zero. Such a special magnet track configuration does without any iron counter-plate device and is advantageously assembled with a coil assembly of the kind described below to form a linear motor that is efficient and of compact design.

Figure 4:
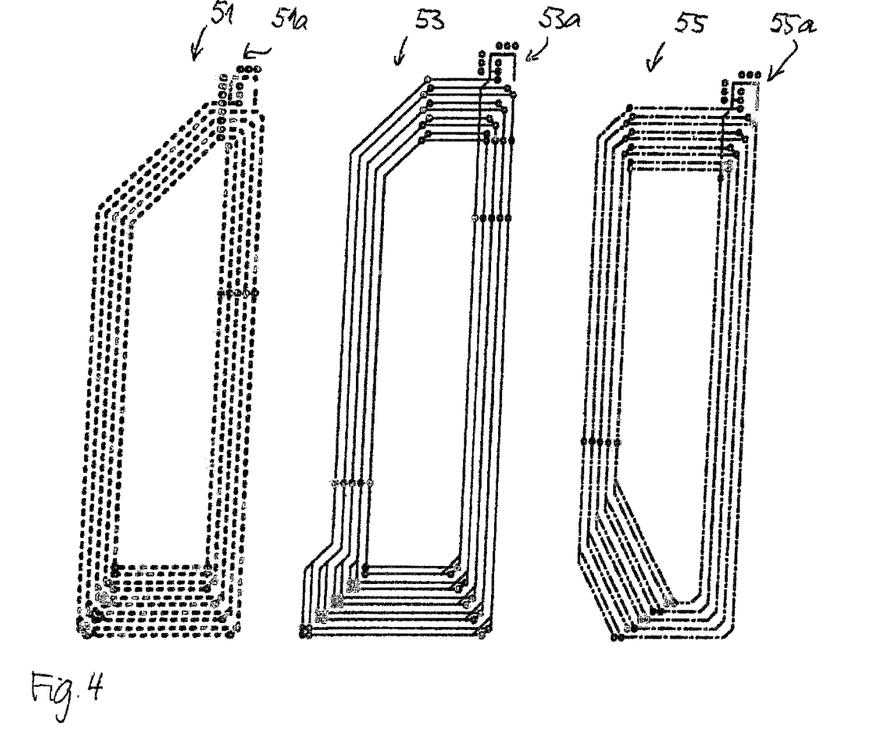

FIG. 4 shows the conductor runs of three flat coils 51, 53 and 55, which together form a coil group of the coil assembly of a linear motor according to the invention in that in each case one of them is connected to one of the three phases of a three-phase alternating current network (three-phase mains). For distinguishing the conductor tracks of the individual coils in representations hereinafter, these are drawn in dashed lines in the case of coil 51, in solid lines in the case of coil 53, and in dash-dotted lines in the case of coil 55. The open circles each designate connection or torsion points, the function and practical implementation of which will be described in more detail below. The conductor tracks of the flat coils are each realized as tracks in one or two conductor planes of an electrically and magnetically isolating support provided with conducting layers, which will also be explained in more detail below.

As can be seen in the Figure, the basic shape of the conductor run of all of the three flat coils 51, 53, 55 is substantially rectangular, wherein in each case a virtual corner of the rectangle is omitted and "bridged" by conductor portions being inclined with respect to the two adjacent edges. In each of the flat coils, an exterior small connection area 51a, 53a, 55a is provided near a corner of the rectangle.

According to an aspect of the invention, each of the three flat coils 51, 53, 55 is formed using two conductor planes of a support such that all three flat coils are placed so as to be nested in each other or overlapping with each other, and—in the preponderant part of the respective conductor run of each coil—conductor runs are nevertheless present in both conductor layers and thus both conductor layers can be utilized in a highly efficient manner.

Figure 5:
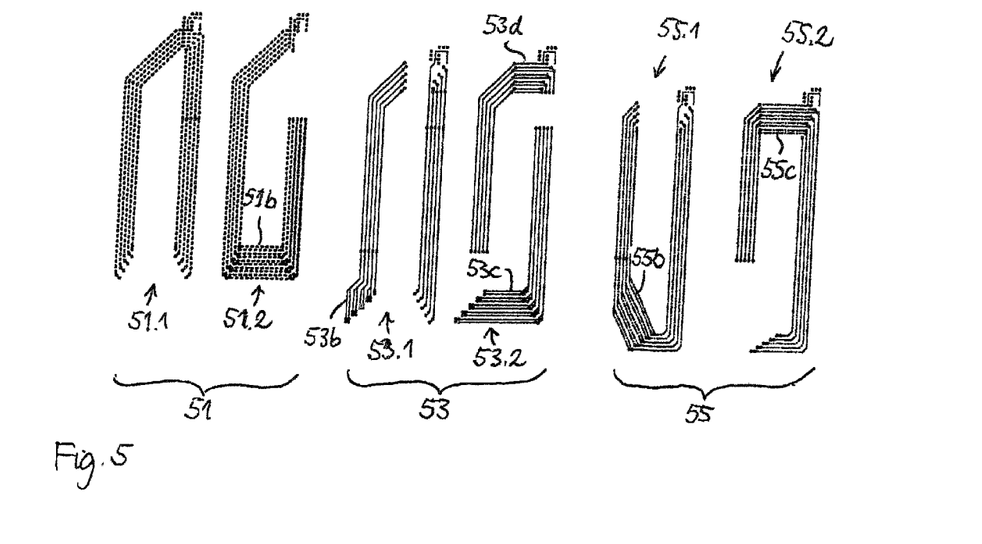
Figure 6:
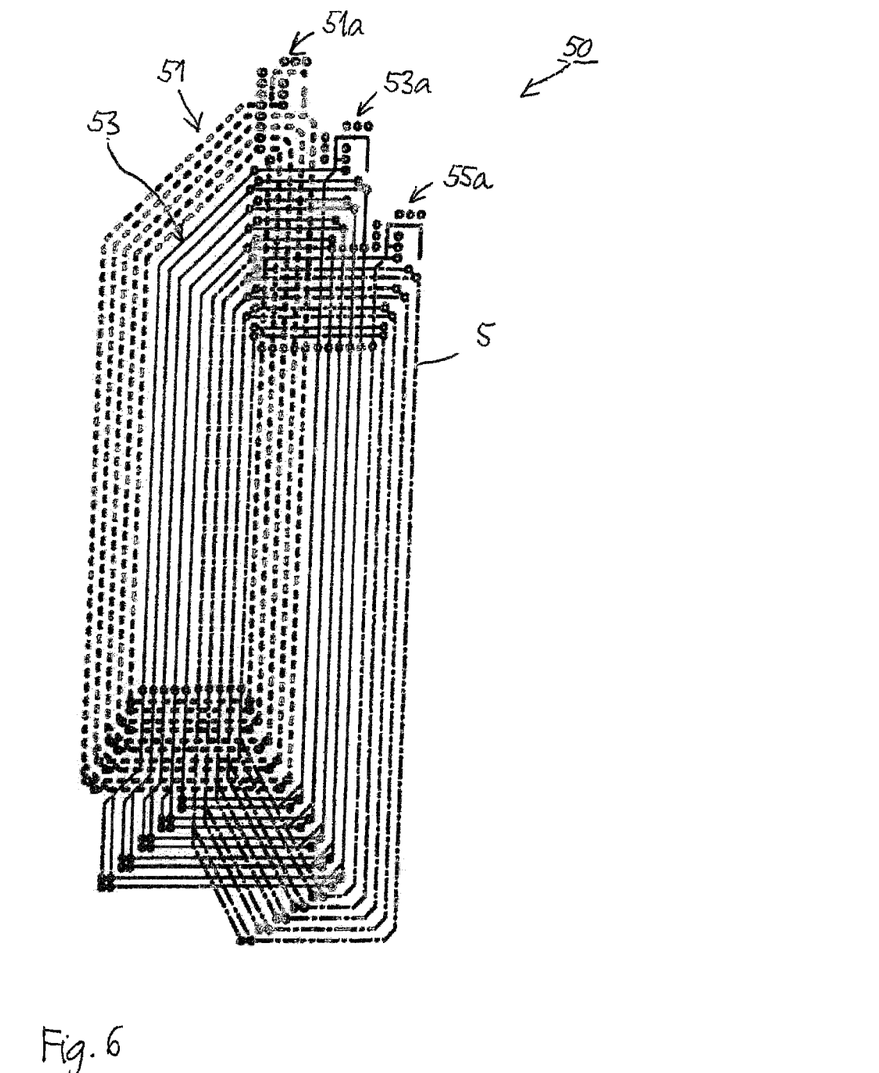

This can be understood in a synopsis of FIGS. 5 and 6 as follows: FIG. 5 shows the conductor tracks of each of the flat coils 51, 53, 55 in each case in the first and second conductor plane of a support (not illustrated), and FIG. 6 shows in a manner of a top view how the three coils are nested in each other.

This nesting or overlapping is enabled in that in segments of the conductor runs of each of the three flat coils (hereinafter referred to as "crossover regions"), only one of the two available conductor planes is utilized, whereas crossing conductor tracks of another one of the three coils run in the second plane. The conductor runs are designed such that a maximum of two of the three coils are crossing, but not all of the three will be crossing at any point. Thus, it becomes possible to get along with two conductor planes despite the presence of three coils. FIG. 5 shows the respective conductor tracks 51.1, 51.2 of the flat coil 51 in the first and second conductor plane, respectively, of the conductor tracks 53.1 and 53.2, respectively, of the second flat coil in the first and second conductor plane, respectively, and of the conductor tracks 55.1 and 55.2, respectively, of the third flat coil in the first and second conductor plane, respectively.

Here, it is also shown schematically, that in a part of those conductor portions which are realized in only one of the two conductor planes, a widening is provided; cf. the portions 51b; 53b, 53c and 53d, and 55b and 55c. Hereby, the specific current load of the respective conductor tracks and thus the resistance heating in them is reduced, and the widened conductor tracks may even serve as heat sinks for the respective flat coil.

In the practical implementation of the flat coils in two (or more) conductor planes of a multi-plane printed circuit board, the transitions between the conductor runs in the first and second plane (and further planes, if need be) are realized by vertical vias, accordingly bores which are filled to be conductive or the wall of which is lined to be conductive, and to which a conductor track is guided that is to be connected to the respective other plane (or a plurality of other planes; cf. the explanations below).

The technology of realizing vias in multi-plane printed circuit boards as well as structuring the conductor layers of such printed circuit boards for forming conductor tracks is known to the skilled person so that corresponding explanations can be dispensed with here.

Figure 7:
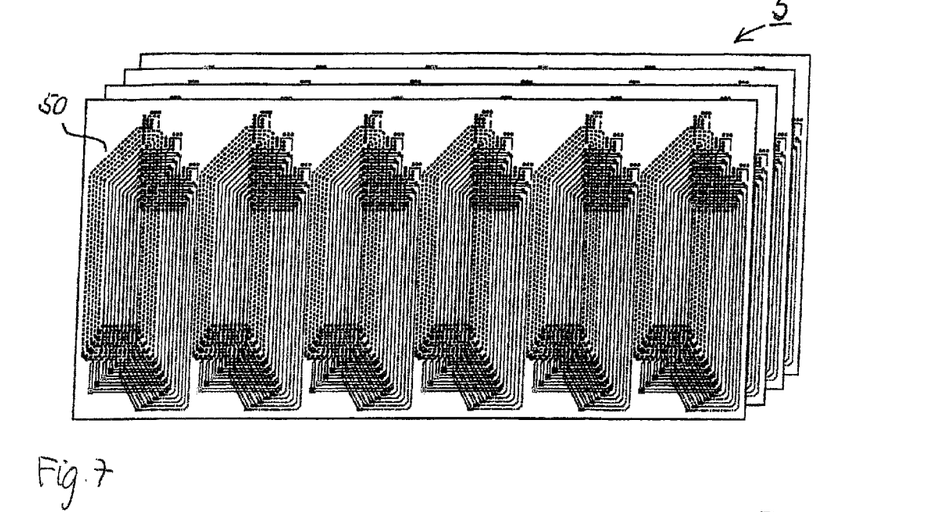

FIG. 7 schematically show a series and stack arrangement of in each case six coil groups 50 arrayed side-by-side of the structure shown in FIG. 6, by means of which an implementation of the coil assembly or the rotor 5 according to FIG. 1 or 2 can be realized as a whole. By way of example, four support layers (in each case coated on both sides to be conductive) of a multi-plane printed circuit board are shown, in each of which a combined conductor run being realized as illustrated in FIG. 5. In addition, the four layers are interconnected by the vias in such a manner that the respective conductor tracks are quadrupled. It should be noted that the number of support layers here is merely exemplary; in practice, multi-plane printed circuit boards having up to 20 (or more) conductor planes are utilized.

Figure 8:
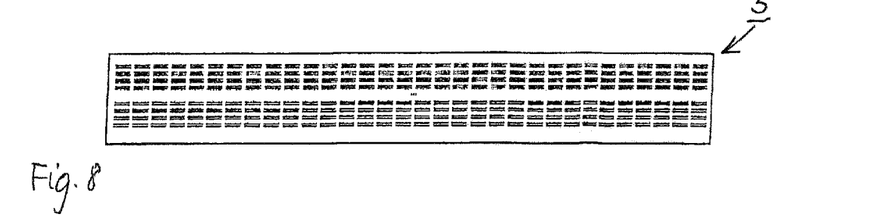

FIG. 8 shows in a schematic longitudinal sectional representation of the coil assembly 5 that each of the conductor planes is utilized as a result of the coils of each coil group being nested in each other and the individual coil groups being densely arrayed into an overall coil assembly with conductor tracks closely adjacent to one another. There are virtually no larger areas of the individual conductor layers which would not be utilized for the conductor tracks of the flat coils so that the proposed configuration allows a coil assembly of a linear motor to be realized, which is densely packed in an optimum way and can be operated with high currents.

Figure 9:
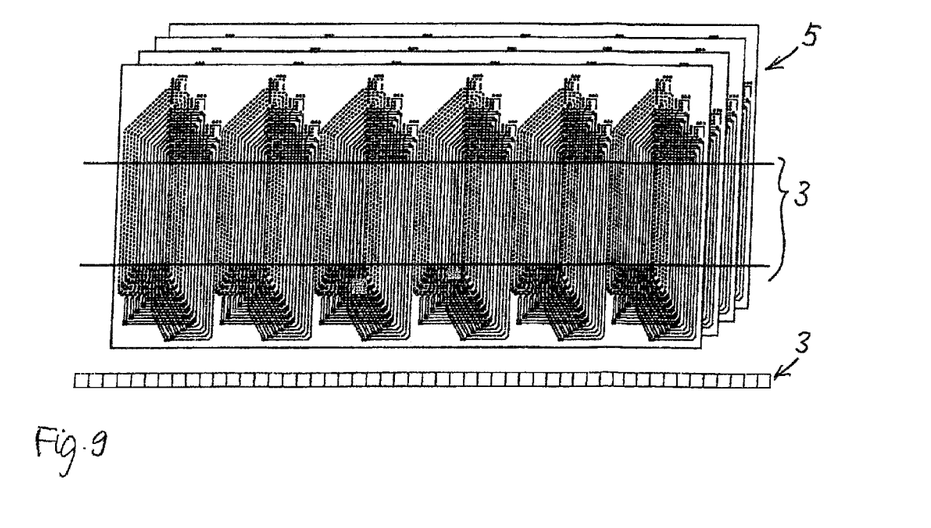

With reference to FIG. 9, which shows the multilayered coil assembly 5 from FIG. 7 together with a magnetic track 3 in the manner of a top view, it will be pointed out that the magnetic track preferably is significantly narrower than the coil assembly. Specifically, its width is dimensioned so as to cover only the conductor portions of the flat coils of the coil assembly that run in a straight line in parallel to one another, but not the portions and crossover portions running obliquely or in parallel to the magnetic track. This configuration is selected for the purpose of homogenizing the flow of forces and avoiding interfering inhomogeneities in the magnetic field of the coil assembly acting upon the magnetic track.

Figure 10:
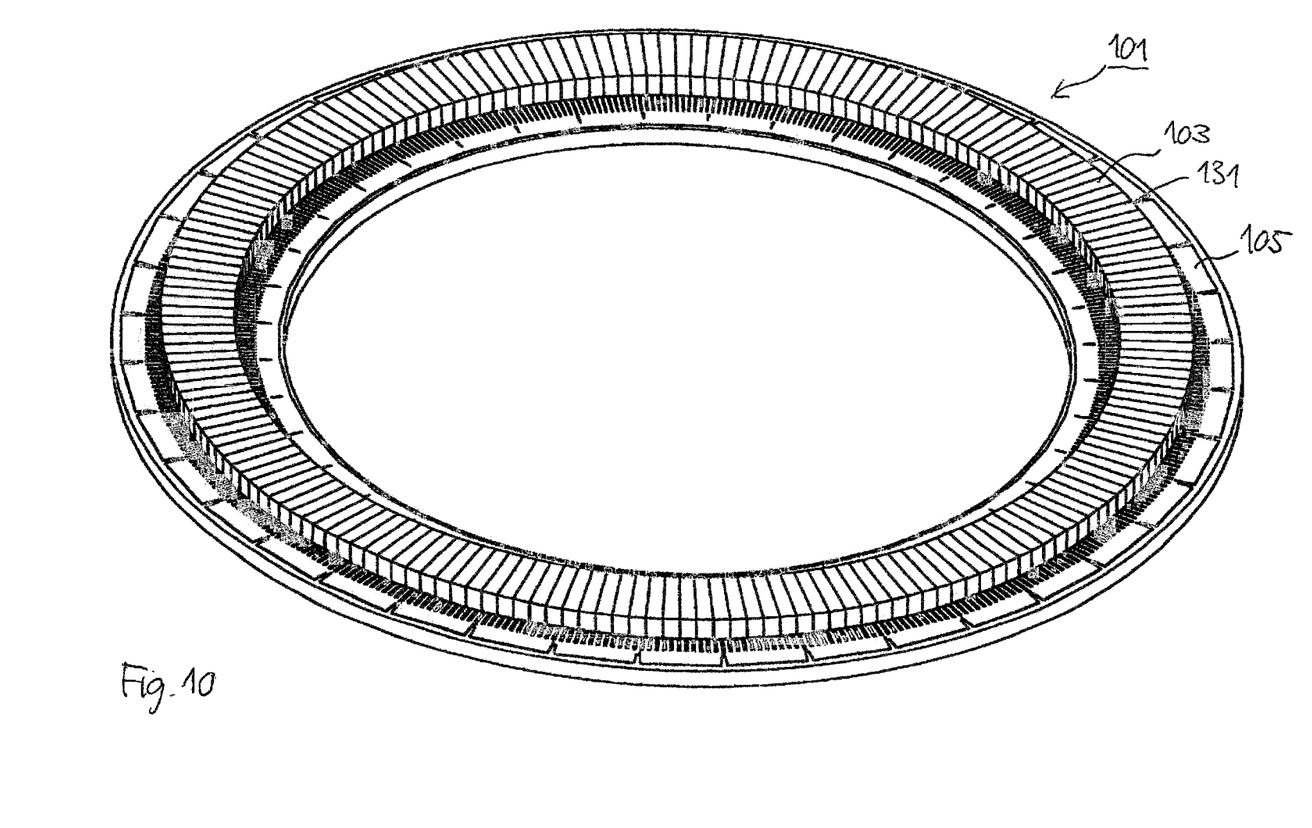

FIG. 10 shows in a schematic perspective representation as a further implementation of an electric motor in which the invention can be employed, a rotary drive 101. The latter comprises a circular ring-shaped stator 103 of substantially rod-shaped permanent magnets 131 arrayed in a corresponding ring shape, and a rotor 5 likewise closed in a ring shape with a coil assembly of the kind specified above. As already mentioned in the implementations explained further above, the assignment of stator/rotor may also be kinematically reversed. Stator and rotor do not necessarily need to have a circle shape, neither are they required to be closed in a circle shape, but may even have the shape of a segment of a circle.

Between the linear motors shown in FIGS. 1 to 2C and the rotatory drive shown in FIG. 10, "intermediate stages" are also possible in the context of the invention, i.e. motors having arbitrarily arcuate stators and rotors which are not self-contained. It can be understood that in non-linear arrangements both the magnet elements of the corresponding magnet arrangements and the coils of the corresponding coil assemblies will have a shape deviating from the rod or rectangle shape mentioned further above. In the magnet elements, a tapering toward an end will normally exist, and the coils will be substantially trapezoidal, or trapezoidal or triangular coils are interposed into the coil assembly between substantially rectangular coils having the structure according to the invention. The explanations above of aspects of the invention and their practical implementation apply all the same analogously for the design of such coils.

Incidentally, the implementation of the invention is not restricted to the exemplary embodiments illustrated in the Figures and described above but is also possible in manifold modifications and combinations of the individual configurations and features that are within the scope of protection of the attached claims.

The invention claimed is:

1. An electric motor, having:
    at least one magnetic track, which has a plurality of magnet elements connected in a line in a longitudinal direction or in the shape of a ring, and
    at least one coil assembly, which includes a support that is substantially electrically and magnetically non-conductive with respect to the magnetic track, which is configured such that the coil assembly and the magnetic track are capable of carrying out a guided movement relative to each other, and which includes at least one group of three conductive flat coils, wherein each of the three flat coils is connected to one phase of a three-phase power supply, and wherein conductor tracks of the three flat coils of the group or of each group are arranged so as to be nested in each other or overlap with each other in a first and second support conductor plane, which are electrically insulated from each other by an insulating intermediate layer, such that parts of the conductor pattern of each of the three flat coils are designed to be connected one over the other and together in parallel in the first and second conductor plane, and
    two of the three overlapping flat coils in each case have crossover regions in which the conductor tracks of the first flat coil only run in the first support conductor plane and the conductor tracks of the second flat coil only run in the second support conductor plane.

2. The electric motor according to claim 1, wherein the magnetic track with the magnet elements and the flat coils of the coil assembly are dimensioned in mutual coordination such that the crossover regions of the flat coils are at least mainly outside of a projection of the magnet elements onto the coil assembly.

3. The electric motor according to claim 1, wherein the magnetic track has a plurality of magnet elements in an Halbach array configuration.

4. The electric motor according to claim 1, wherein the magnetic track is assigned to a stator, and the coil assembly is assigned to a rotor of the linear motor, and in particular the stator substantially has the shape of a U profile or rectangle which is elongate or closed in a ring-shape, and in adaptation to the shape of the stator, the rotor is realized to be plate-shaped or band-shaped such as to be able to move longitudinally inside the U profile or rectangle.

5. The electric motor according to claim 1, wherein the coil assembly comprises two or more groups of three flat coils each connected to one phase of the three-phase power supply, which are arrayed together in a longitudinal direction or in a ring-shape on or in the support.

6. The electric motor according to claim 1, wherein the support is designed as a multi-plane printed circuit board, and in each case, exactly two adjacent conductor planes of the multi-plane printed circuit board are structured to form the three overlapping flat coils belonging together, wherein in the crossover regions, the transitions of a conductor run from the first into the second conductor plane or vice versa are realized by vertical vias.

7. The electric motor according to claim 6, wherein each of the flat coils has a small connection and via region arranged directly on a short side of the respective flat coil, and in which vias for connecting the superimposed, series-connected conductor tracks and for the external connection of the flat coil are placed, wherein a dimension of the connection and via region, in particular its length in the longitudinal direction of an elongate flat coil, is less than 10%, in particular less than 5% of the corresponding dimension of the flat coil.

8. The electric motor according to claim 7, wherein the small connection region is in each flat coil positioned close to a corner of a polygonal flat coil configuration and comprises a substantially hook-shaped conductor portion.

9. The electric motor according to claim 6, wherein the three flat coils belonging together formed by structuring in each case two conductor planes of the multi-plane printed circuit board, are configured to be substantially rectangular and arranged to be nested or overlapping such that the long sides of the three flat coils in the first and second conductor plane each run in parallel to one another, and within the rectangle of one of the three flat coils, in each case the major part of the conductor run each of one corresponding side of the two other flat coils is arranged.

10. The electric motor according to claim 9, wherein in the substantially rectangular conductor run of the flat coils, a virtual corner of the rectangle is replaced by conductor portions running obliquely to the adjacent sides.

11. The electric motor according to claim 6, wherein the three flat coils belonging together formed by structuring in each case two conductor planes of the multi-plane printed circuit board, are configured to be substantially trapezoidal and arranged to be nested or overlapping such that the non-parallel sides of the trapezoidal shapes of the three flat coils in the first and second conductor plane each run in parallel to one another, and within the trapezoid of one of the three flat coils, in each case the major part of the conductor run each of one corresponding side of the two other flat coils is arranged.

12. The electric motor according to claim 11, wherein all conductors of all of the three flat coils at the long sides of the trapezoidal conductor configuration or at the non-parallel sides of the trapezoidal conductor configuration each have the same distance from one another, and within the three flat coils belonging together, a larger distance range is not present.

13. The electric motor according to claim 12, wherein the distance between the adjacent conductor tracks is smaller than their width, in particular smaller than half of their width.

14. The electric motor according to claim 11, wherein in the substantially trapezoidal conductor run of the flat coils, a virtual corner of the trapezoid is replaced by conductor portions running obliquely to the adjacent sides.

15. The electric motor according to claim 6, wherein at least a part of the conductor runs is widened at least in a part of the crossover regions, and due to the current load being reduced by the widening, act as heat sinks of the respective flat coil.

16. The electric motor according to claim 1, wherein the support is designed as a multi-plane printed circuit board with 2m conductor planes (m≥2), in which each of the three overlapping flat coils belonging together of one group comprises 2 to m series-connected, substantially identical conductor tracks, wherein the electrical connections between the series-connected conductor tracks are realized by means of vertical vias through the multi-plane printed circuit board.

* * * * *